(12) United States Patent
Lu et al.

(10) Patent No.: US 12,713,336 B2
(45) Date of Patent: Aug. 18, 2026

(54) NETWORK SELECTION METHOD, TERMINAL DEVICE AND NETWORK DEVICE

(71) Applicant: GUANGDONG OPPO MOBILE TELECOMMUNICATIONS CORP., LTD., Dongguan (CN)

(72) Inventors: Fei Lu, Dongguan (CN); Chenho Chin, Dongguan (CN); Jingran Chen, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 677 days.

(21) Appl. No.: 18/092,000

(22) Filed: Dec. 30, 2022

(65) Prior Publication Data

US 2023/0217364 A1 Jul. 6, 2023

Related U.S. Application Data

(63) Continuation of application No. PCT/CN2021/076507, filed on Feb. 10, 2021.

(51) Int. Cl.

| | |
|---|---|
| ***H04W 48/18*** | (2009.01) |
| ***H04W 8/02*** | (2009.01) |
| ***H04W 48/16*** | (2009.01) |
| ***H04W 84/04*** | (2009.01) |

(52) U.S. Cl.
CPC ............. *H04W 48/18* (2013.01); *H04W 8/02* (2013.01); *H04W 48/16* (2013.01); *H04W 84/042* (2013.01)

(58) Field of Classification Search
CPC ....... H04W 48/18; H04W 8/02; H04W 48/16; H04W 84/042
See application file for complete search history.

(56) References Cited

U.S. PATENT DOCUMENTS

| | | | | |
|---|---|---|---|---|
| 11,856,510 | B2 * | 12/2023 | Jing | H04W 8/02 |
| 2012/0243467 | A1 * | 9/2012 | Vallurupalli | H04W 48/18 370/328 |
| 2015/0334646 | A1 | 11/2015 | Buckley et al. | |
| 2020/0213000 | A1 | 7/2020 | Arur et al. | |
| 2021/0136715 | A1 * | 5/2021 | Jeong | H04W 60/00 |
| 2022/0046424 | A1 * | 2/2022 | Edge | H04W 48/04 |
| 2022/0150812 | A1 * | 5/2022 | Lin | H04W 60/04 |

(Continued)

FOREIGN PATENT DOCUMENTS

| | | | |
|---|---|---|---|
| CN | 101415173 | A | 4/2009 |
| CN | 102340845 | A | 2/2012 |

(Continued)

OTHER PUBLICATIONS

3GPP TR 23.737 v17.1.0 (Year: 2020).*

(Continued)

*Primary Examiner* — Nizar N Sivji
(74) *Attorney, Agent, or Firm* — BAYES PLLC

(57) ABSTRACT

A network selection method includes: selecting, by a terminal device in response to a preset situation and according to a location of the terminal device and a selection priority list, a public land mobile network (PLMN) of satellite network corresponding to the location of the terminal device.

20 Claims, 7 Drawing Sheets

(56) References Cited

U.S. PATENT DOCUMENTS

| | | | | |
|---|---|---|---|---|
| 2022/0232463 A1* | 7/2022 | Sadique | ................ | H04W 48/18 |
| 2022/0232464 A1* | 7/2022 | Matolia | .............. | H04B 7/18554 |
| 2023/0180117 A1* | 6/2023 | Lee | ....................... | H04L 67/289 |
| | | | | 370/329 |
| 2024/0121744 A1* | 4/2024 | Suh | ....................... | H04W 60/00 |

FOREIGN PATENT DOCUMENTS

| | | | |
|---|---|---|---|
| CN | 102474814 | A | 5/2012 |
| CN | 103731813 | A | 4/2014 |
| CN | 105519200 | A | 4/2016 |
| CN | 105554851 | A | 5/2016 |
| CN | 105580459 | A | 5/2016 |
| CN | 105657789 | A | 6/2016 |
| CN | 107710831 | A | 2/2018 |
| CN | 110234156 | A | 9/2019 |
| CN | 111213397 | A | 5/2020 |
| EP | 3952464 | A1 | 2/2022 |
| KR | 10-2021-0006370 | * | 1/2021 |
| WO | 2020142342 | A1 | 7/2020 |
| WO | 2020192454 | A1 | 10/2020 |

OTHER PUBLICATIONS

CN 105554851 A (May 2016).*

DAV_-_63_112_662_-_UE_Handling_Of_Recommended_MCC_Information (Year: 2020).*

International Search Report issued in International application No. PCT/CN2021/076507, mailed Nov. 9, 2021. 4 pages.

Written Opinion of the International Searching Authority issued in International application No. PCT/CN2021/076507, mailed Nov. 9, 2021, 7 pages.

3GPP TS 38.212 V16.3.0 (Sep. 2020), “3rd Generation Partnership Project; Technical Specification Group Radio Access Network; NR; Multiplexing and channel coding (Release 16)”, 147 pages.

3GPP TR 24.821 V0.2.0 (Dec. 2020), “3rd Generation Partnership Project; Technical Specification Group Core Network and Terminals; Study on PLMN selection for satellite access (Release 17)”, 19.

Second Office Action issued in corresponding Chinese Application No. 202180057079.X, mailed on Feb. 19, 2025, 18 pages.

Extended European Search Report issued in corresponding European application No. 21925221.0, mailed Feb. 14, 2024.

First Examination Opinion Notice issued in corresponding Chinese Application No. 202180057079.X, dated Nov. 16, 2024, 24 pages.

Notice of Priority Examination of Patent Application issued in corresponding Chinese Application No. 202180057079.X, dated Oct. 23, 2024. 6 pages.

* cited by examiner

200

In a preset condition, a terminal device select, according to the location of the terminal device and a priority selection list, a PLMN of a satellite network corresponding to the location of the terminal device

S210

| | |
|---|---|
| PLMN a: MCC-X + MNC a | Available PLMNs corresponding to Country X |
| ...... | |
| PLMN b: MCC-X + MNC b | |
| ...... | |
| ...... | |
| PLMN c: MCC-Y + MNC c | Available PLMNs corresponding to Country Y |
| ...... | |
| PLMN d: MCC-Y + MNC d | |

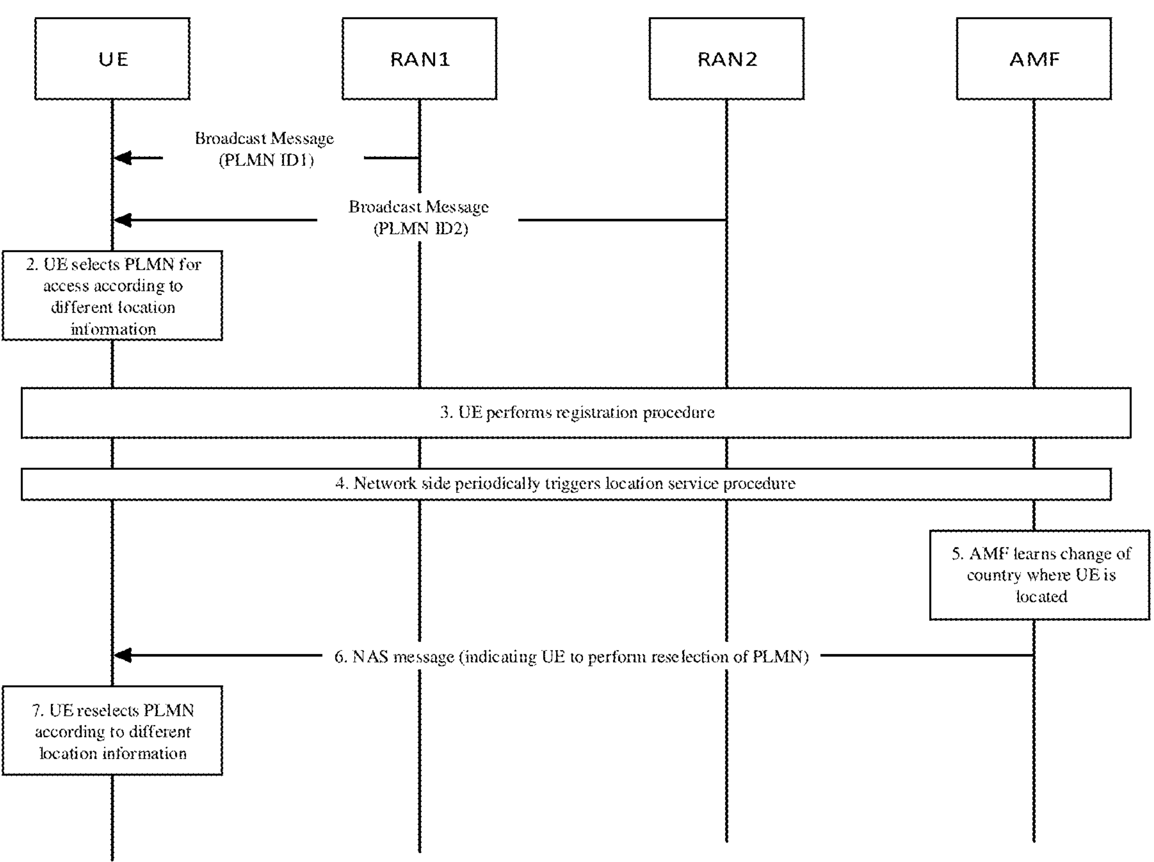
FIG. 8
900
Network device determines whether location of terminal device changes and, if yes, sends first indication message to terminal device, where the first indication message indicates terminal device to perform PLMN selection — S910
FIG. 9
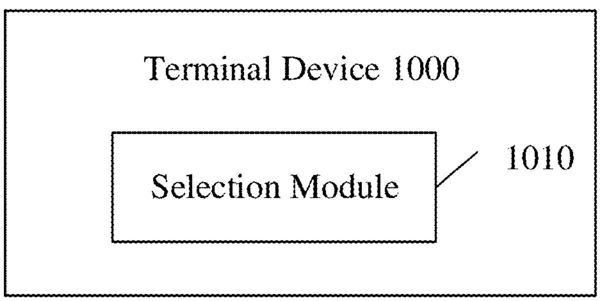
FIG. 10

NETWORK SELECTION METHOD, TERMINAL DEVICE AND NETWORK DEVICE

CROSS-REFERENCE TO RELATED APPLICATION

This application is a continuation of PCT application No. PCT/CN2021/076507, filed Feb. 10, 2021, entitled "NETWORK SELECTION METHOD, TERMINAL DEVICE AND NETWORK DEVICE," which is hereby incorporated by reference in its entirety.

TECHNICAL FIELD

This application relates to the field of communications, and more particularly, to a network selection method, a terminal device and a network device.

BACKGROUND

In a satellite network, due to the coverage characteristic of satellites, one satellite may cover multiple countries, which may lead to such a problem that the public land mobile network (PLMN) of the satellite network selected by the user equipment (UE) is not consistent with the position (e.g., country/region) where it is located.

SUMMARY

Embodiments of this application provide a network selection method, a terminal device, and a network device, which can realize that the PLMN of satellite network selected by the terminal is consistent with the location where it is located.

Some embodiments of this application provide a network selection method, including:

selecting, by a terminal device in response to a preset situation and according to a location of the terminal device and a selection priority list, a public land mobile network (PLMN) of satellite network corresponding to the location of the terminal device.

Some embodiments of this application further provide a method for indicating network selection, including:

determining, by a network device, whether a location of a terminal device changes; and sending, if the location changes, a first indication message to the terminal device, wherein the first indication message indicates the terminal device to perform PLMN selection.

Some embodiments of this application further provide a terminal device, including:

a selection module, configured to determine, in response to a preset situation and according to a location of the terminal device and a selection priority list, a public land mobile network (PLMN) of satellite network corresponding to the location of the terminal device.

Some embodiments of this application further provide a network device, including:

a determination module, configured to determine whether a location of a terminal device changes; and an indication module, configured to send, in response to that the location of the terminal device changes, a first indication message to the terminal device, wherein the first indication message indicates the terminal device to perform PLMN selection.

Some embodiments of this application also provide a terminal device, including: a processor and a memory, where the memory is configured to store a computer program, and the processor is configured to call and run the computer program stored in the memory to perform the network selection method according to any embodiment as described above.

Some embodiments of this application also provide a network device, including: a processor and a memory, where the memory is configured to store a computer program, and the processor is configured to call and run the computer program stored in the memory to perform the method for indicating network selection according to any embodiment as described above.

Some embodiments of this application also provide a chip, including: a processor for calling and running a computer program from a memory, thereby causing a device installed with the chip to perform the network selection method according to any embodiment as described above.

Some embodiments of this application also provide a chip, including: a processor for calling and running a computer program from a memory, thereby causing a device installed with the chip to perform the method for indicating network according to any embodiment as described above.

Some embodiments of this application further provide a computer-readable storage medium for storing a computer program, where the computer program causes a computer to perform the network selection method according to any embodiment as described above.

Some embodiments of this application further provide a computer-readable storage medium for storing a computer program, where the computer program causes a computer to perform the method for indicating network according to any embodiment as described above.

Some embodiments of this application also provide a computer program product, including computer program instructions, where the computer program instructions cause a computer to perform the network selection method according to any embodiment as described above.

Some embodiments of this application also provide a computer program product, including computer program instructions, where the computer program instructions cause a computer to perform the method for indicating network according to any embodiment as described above.

Some embodiments of this application also provide a computer program, where the computer program causes a computer to perform the network selection method according to any embodiment as described above.

A network selection instruction method is a computer program, where the computer program causes a computer to perform the method for indicating network according to any embodiment as described above.

According to some embodiments of this application, the terminal device can select a corresponding PLMN according to its own location in response to the preset situation, thereby ensuring that the selected PLMN of satellite network is consistent with the position (e.g., country/region) where it is located.

BRIEF DESCRIPTION OF THE DRAWINGS

FIG. 8 is an implementation flowchart of Embodiment 5 of this application.

FIG. 9 is a schematic flowchart of a method 900 for indicating network selection according to some embodiments of this application.

FIG. 10 is a block diagram of a terminal device 1000 according to some embodiments of this application.

DETAILED DESCRIPTION

Figures 1, 2:
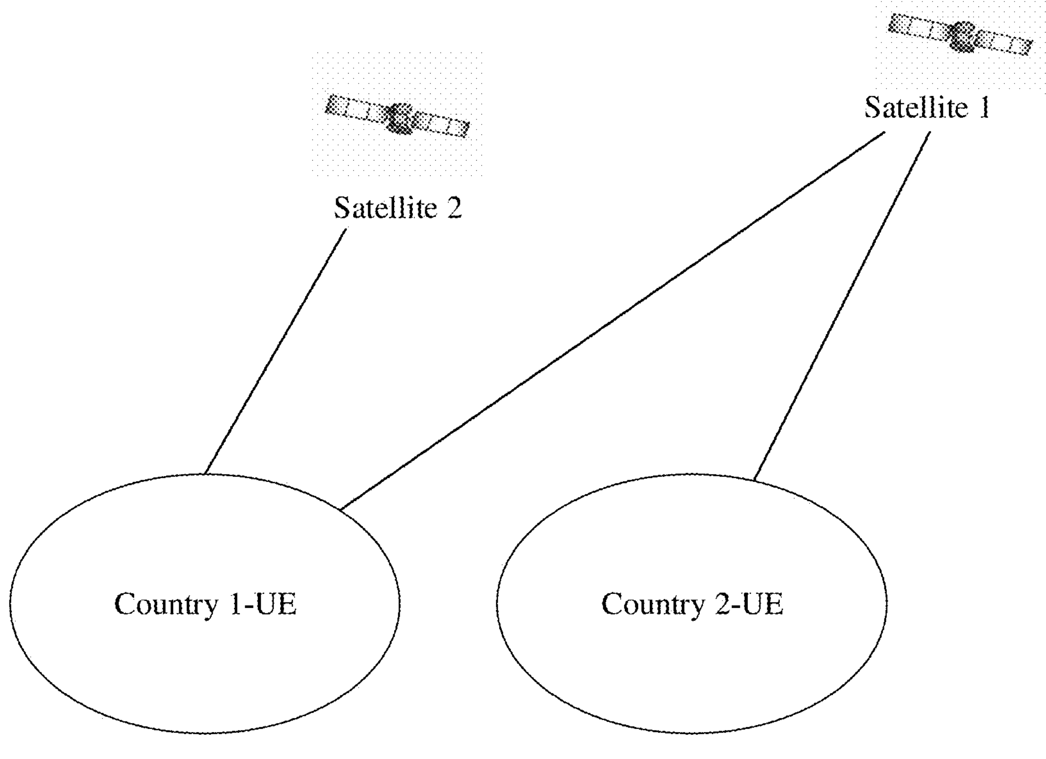
FIG. 1 is a schematic diagram of an application scenario according to some embodiments of this application.
FIG. 2 is a schematic flowchart of a network selection method 200 according to some embodiments of this application.

The technical solutions according to some embodiments of this application will be described below with reference to the accompanying drawings in the embodiments of this application.

It should be noted that the terms "first" and "second" in the description and claims as well as the above drawings according to the embodiments of this application are used to distinguish similar objects, and are not necessarily used to describe a specific order or sequence. The objects described by "first" and "second" at the same time may be the same or different.

The technical solutions according to some embodiments of this application may be applied to various communication systems, for example, GSM (Global System of Mobile communication) system, CDMA (Code Division Multiple Access) system, WCDMA (Wideband Code Division Multiple Access) system, GPRS (General Packet Radio Service), LTE (Long Term Evolution) system, LTE-A (Advanced long term evolution) system, NR (New Radio) system, evolution system of the NR system, LTE-U (LTE-based access to unlicensed spectrum) system, NR-U (NR-based access to unlicensed spectrum) system, UMTS (Universal Mobile Telecommunication System), WLAN (Wireless Local Area Networks), WiFi (Wireless Fidelity), 5G (5th-Generation) system or other communication systems.

Generally speaking, traditional communication systems support a limited number of connections and are easy to implement. However, with the development of communication technology, mobile communication systems will not only support traditional communication, but also support, for example, D2D (Device to Device) communication, M2M (Machine to Machine) communication, MTC (Machine Type Communication), V2V (Vehicle to Vehicle) communication, and the like. Embodiments of this application can also be applied to these communications systems.

Optionally, the communication system in some embodiments of this application may be applied to a CA (Carrier Aggregation) scenario, a DC (Dual Connectivity) scenario, or a SA (Standalone) networking scenario.

Embodiments of this application do not limit the applied spectrum. For example, some embodiments of this application may be applied to licensed spectrum, and may also be applied to unlicensed spectrum.

Various embodiments of this application are described in conjunction with network device and terminal device, where the terminal device may also be referred to as user equipment (UE), access terminal, subscriber unit, subscriber station, mobile station, mobile site, remote station, remote terminal, mobile device, user terminal, terminal, wireless communication device, user agent, user device, or the like. The terminal device may be a station (ST) in the WLAN, or may be a cellular phone, a cordless phone, a session initiation protocol (SIP) phone, a wireless local loop (WLL) station, a personal digital processing (PDA) device, a handheld device with wireless communication capabilities, a computing device or other processing devices connected to wireless modems, or may be an in-vehicle device, a wearable device, and a terminal device in next-generation communication systems, such as the NR network, future-evolved public land mobile network (PLMN), or the like.

As an example without limitation, in some embodiments of this application, the terminal device may also be a wearable device. Wearable devices may also be called wearable smart devices, which are the general term for the intelligent design of daily wear and the development of wearable devices using wearable technology, such as glasses, gloves, watches, clothing and shoes. Wearable device is a portable device that is worn directly on the body or integrated into the user's clothing or accessories. Wearable device is not only a hardware device, but also realizes powerful functions through software support, data interaction, and cloud interaction. In a general sense, wearable smart devices may be of full-feature, large-scale, with complete or partial functions without relying on smart phones, including such as smart watches or smart glasses; or may only focus on a certain type of application function, which needs to cooperate with other devices such as smart phones, including such as various smart bracelets, and smart jewelry for physical sign monitoring.

The network device may be a device for communicating with a mobile device. For example, the network device may be an access point (AP) in WLAN, or a base transceiver station (BTS) in GSM or CDMA, a NodeB (NB) in WCDMA, an evolutional Node B (eNB or eNodeB) in LTE, a relay station, an access point, an in-vehicle device, a wearable device, a network device (gNB) in NR network, a network device in the future-evolved PLMN network, or the like.

In some embodiments of this application, the network device provides services for a cell, and the terminal device communicates with the network device through transmission resources (e.g., frequency domain resources, or spectrum resources) used by the cell, and the cell may be a cell corresponding to the network device (e.g., base station). The cell may belong to a macro base station, or may belong to a base station corresponding to a small cell, where the small cell may include a metro cell, a micro cell, a pico cell, a femto cell, and the like. These small cells have the characteristics of small coverage and low transmit power, and are suitable for providing high-speed data transmission services.

FIG. 1 exemplarily shows a schematic diagram of a coverage of a satellite network in the satellite network. In the satellite network, one satellite may cover multiple countries. As shown in FIG. 1, satellite 1 covers country 1 and country 2, and satellite 2 covers country 1.

It should be understood that the terms "system" and "network" are often used interchangeably herein. The term "and/or" in this disclosure is only used for describing an association relationship between associated objects, indicating that there may be three kinds of relationships. For example, A and/or B may include such three situations that A exists alone, both A and B exist, and B exist alone. In addition, the character "/" in this disclosure generally indicates that the related objects are in an "or" relationship.

It should be understood that the "indication" mentioned in some embodiments of this application may be a direct indication, an indirect indication, or an associated relationship. For example, if A indicates B, it may represent that A directly indicates B, for example, B can be obtained through A; it may also represent that A indicates B indirectly, for example, A indicates C, and B can be obtained through C; it may also represent that there is an association relation between A and B.

In the description of some embodiments of this application, the term "corresponding" may indicate that there is a direct or indirect correspondence between two objects, or may indicate that there is an associated relationship, or a relationship of indicating and being indicated, configuring and being configured, or the like between the two objects.

In order to facilitate the understanding of the technical solutions according to some embodiments of this application, those technologies related to some embodiments of this application are described below. The following related art may be arbitrarily combined with the technical solutions according to some embodiments of this application as optional solutions, which belong to protection scope of the embodiments of this application.

The satellite coverage shown in FIG. 1 is first taken as an example. In one scenario, when UE is in country 1, the UE is in the coverage of satellite 1 and satellite 2; if satellite 1 does not have a ground receiving station in country 1 to serve the UE, the UE cannot select a core network of country 1. In this way, if the UE selects a PLMN of satellite 1, it will lead to non-compliance with the policy supervision and lawful interception requirements of the country where the UE is located.

In another scenario, it is assumed the UE selects the PLMN corresponding to satellite 1 when it is in country 2. When the UE moves from country 2 to country 1, the UE is in the coverage of satellite 1 and satellite 2, and the PLMN currently used by the UE is just the PLMN broadcast by satellite 1. Accordingly, based on the PLMN selection method in the related art, even if the UE moves to country 1, the PLMN selection process will not be triggered, and satellite 1 is still selected for serving the UE. If satellite 1 does not have a ground receiving station in country 1 to serve the UE, it will also lead to non-compliance, of the PLMN selected by the UE, with the policy supervision and lawful interception requirements of the country where the UE is located.

It can be seen that there is a situation in the related art that the PLMN of the satellite network selected by the UE does not match the location (e.g., country/region) where the UE is located.

Regarding the above problems, some embodiments of this application provide a network selection method. FIG. 2 is a schematic flowchart of the network selection method 200 according to some embodiments of this application. The method may optionally be applied to the system shown in FIG. 1, but is not limited thereto. The method includes at least some of the following content.

In S210, in response to a preset situation, the terminal device selects, according to a location of the terminal device and a selection priority list, a PLMN of a satellite network corresponding to the location of the terminal device.

In some embodiments, the preset situation may include: the location of the terminal device changes.

In some embodiments, the preset situation may include: a PLMN selection timer expires.

In some embodiments, the preset situation may include: the terminal device receives a first indication message from the network device, where the first indication message indicates the terminal device to perform PLMN selection.

Specific examples are given below to describe in detail the specific examples of selecting the PLMN of the satellite network in various situations.

EMBODIMENT 1

Figures 3, 4A:
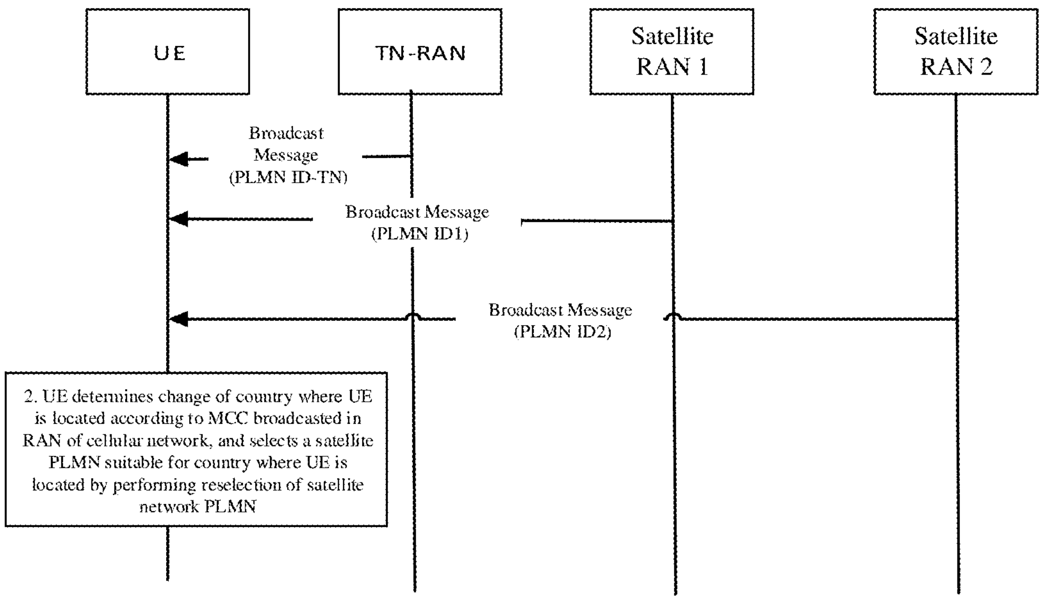
FIG. 3 is an implementation flowchart of Embodiment 1 of this application.
FIG. 4A is a schematic diagram of an example of a selection priority list according to some embodiments of this application.

FIG. 3 is an implementation flowchart of Embodiment 1 of this application, including the following steps.

In step 1, a satellite radio access network (RAN) covering country 1 and country 2, for example, the satellite RAN 1 performs broadcasts, where the broadcast message carries a corresponding PLMN identifier (e.g., PLMN ID 1), and the PLMN ID 1 includes a mobile country code (MCC) and a mobile network code (MNC), for example, (MCC 1+MNC 1). The satellite RAN 2 covering country 2 performs broadcast, where the broadcast message carries a PLMN identifier (e.g., PLMN ID 2), and the PLMN ID 2 includes (MCC 2+MNC 2). The RAN in the terrestrial network (TN), hereinafter referred to as TN-RAN, covering country 1 performs broadcast, where the broadcast message of the TN-RAN carries a PLMN identifier (e.g., PLMN ID-TN), and the PLMN ID-TN includes (MCC-TN+MNC-TN). UE monitors the broadcast messages of the above-mentioned satellite RAN 1, satellite RAN 2 and TN-RAN.

In step 2, the UE determines whether the location of the terminal device has changed according to the MCC in the PLMN ID-TN carried in the broadcast messages of the TN-RAN received at different time points. For example, when the MCCs (i.e., the above-mentioned MCC-TNs) in the broadcast messages of the TN-RAN received by the UE at different time points are different, it can be acknowledged that the country where the UE is located has changed. When the country where the UE is located changes, the UE re-selects the PLMN of the satellite network according to its own location information and the selection priority list.

In some embodiments, the above-mentioned selection priority list is configured on the terminal device.

Optionally, the above-mentioned selection priority list includes PLMN information of satellite networks corresponding to different locations.

In some embodiments, the above-mentioned PLMN information may include MCC information and MNC information, where the MCC information may correspond to a locations.

Figure 4B:
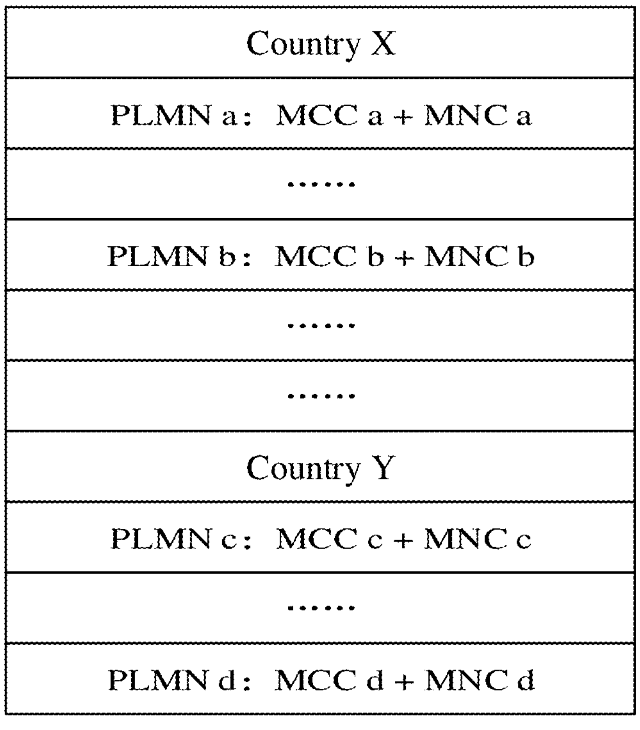
FIG. 4B is a schematic diagram of another example of a selection priority list according to some embodiments of this application.

FIG. 4A and FIG. 4B are schematic diagrams illustrating two examples of selection priority lists of this application. The selection priority lists are pre-configured on the UE, and the UE may be configured with one of the selection priority lists or both of them.

As shown in FIG. 4A, the available PLMNs of the satellite network configured by country X include PLMN a, PLMN b, etc., where the MCC information included in the PLMN information of PLMN a, PLMN b and the like are all MCC-X, and the MCC-X is consistent with the MCC broadcast by the terrestrial cellular network of country X.

The available PLMNs of the satellite network configured by country Y include PLMN c, PLMN d, etc., where the MCC information included in the PLMN information of PLMN c, PLMN d and the like is MCC-Y, and the MCC-Y is consistent with the MCC broadcast by the terrestrial cellular network of country Y. It can be seen that in the selection priority list shown in FIG. 4A, the MCC in the PLMN of the satellite network can represent a corresponding country. Since the MCC in the PLMN of the satellite network in the selection priority list can represent the corresponding country, the terminal device can directly perform selection according to the MCC, for example, it selects the PLMN containing the same MCC as the MCC in the broadcast message of the TN-RAN. Since the MCC in the broadcast message of the TN-RAN can indicate the location of the UE, this method is essentially implemented by selecting a corresponding PLMN of the satellite network according to the location of the UE and the selection priority list. If there is a PLMN ID, corresponding to the forgoing selected PLMN, in the broadcast message of the satellite RAN 1 or satellite RAN 2 monitored by the UE in step 1, the UE selects the satellite network corresponding to the PLMN ID to serve it.

As shown in FIG. 4B, the available PLMNs of the satellite network configured by country X include PLMN a, PLMN b, etc., where the MCC information included in PLMN a is MCC a, the MCC information included in PLMN b is MCC b, and MCC a and MCC b are specialized MCCs used by satellite networks and cannot represent corresponding countries. The same is true for the available PLMNs of the satellite network configured in country Y. Therefore, the selection priority list shown in FIG. 4B includes country information, that is, country X corresponds to priority list X, including PLMN a, PLMN b, etc.; country Y corresponds to priority list Y, including PLMN c, PLMN d, etc. Since the MCCs in the PLMNs of the satellite network in the selection priority list cannot represent the corresponding countries, the terminal device can determine the location (e.g., country) where the UE is located according to the MCC in the broadcast message of the TN-RAN, or determine the location (e.g., country) where the UE is located according to positioning information of an upper-layer application, search in the selection priority list according to the location information, and select the PLMN corresponding to the location information from the list. Similarly, if there is a PLMN ID, corresponding to the forgoing selected PLMN, in the broadcast message of the satellite RAN 1 or satellite RAN 2 monitored by the UE in step 1, the UE selects the satellite network corresponding to the PLMN ID to serve it.

EMBODIMENT 2

Figure 5:
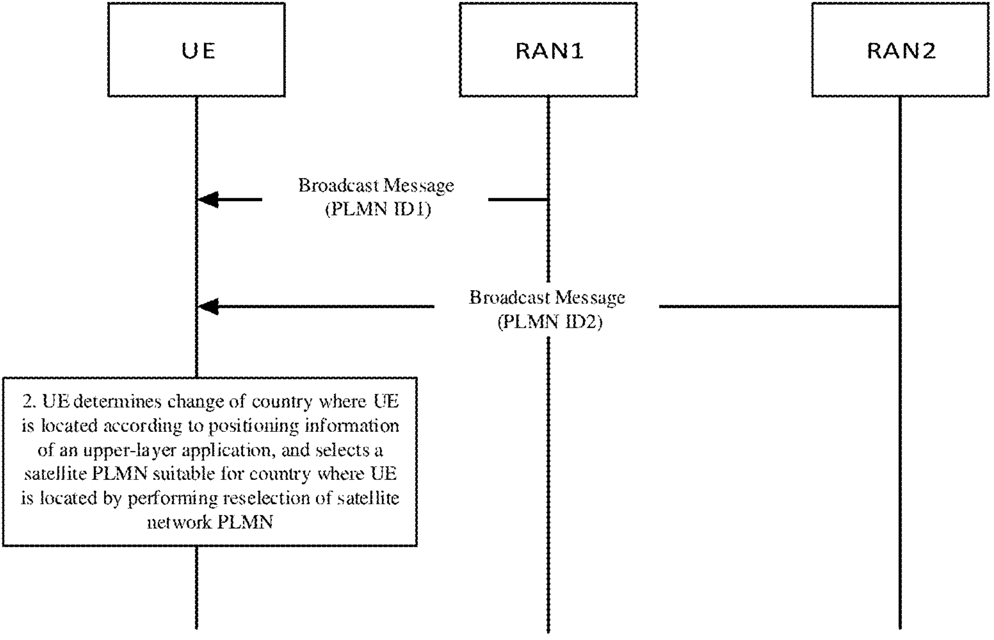
FIG. 5 is an implementation flowchart of Embodiment 2 of this application.

FIG. 5 is an implementation flowchart of Embodiment 2 of this application, including the following steps.

In step 1, the satellite RAN 1 covering country 1 and country 2 performs broadcasting, and the broadcast message carries the corresponding PLMN identifier (e.g., PLMN ID 1), and the PLMN ID 1 includes (MCC 1+MNC 1). The satellite RAN 2 covering country 2 performs broadcasting, the broadcast message carries the PLMN identifier (e.g., PLMN ID 2), and the PLMN ID 2 includes (MCC 2+MNC 2).

In step 2, the UE determines whether the position of the UE changes according to the positioning information of an upper-layer application at different time points. For example, the upper-layer application, for example, a positioning software, notifies the UE's NAS layer of the UE's positioning information (e.g., country information). If the country information notified at different time points varies, the UE may acknowledge that the country where it is located has changed. When the country where the UE is located changes, the UE re-selects the PLMN of satellite network according to its own location information and the selection priority list.

The configuration method and specific content of the selection priority list are the same as those in the Embodiment 1, and are not repeated here.

The UE may determine its own location information according to the MCC in the broadcast message of the TN-RAN. For example, the UE monitors the broadcast message of the TN-RAN covering the country where the UE is currently located and determines, according to the MCC identifier in the PLMN identifier carried in the broadcast message, the country where the UE is currently located.

Alternatively, the UE may determine the country where it is currently located according to the positioning information of the upper-layer application.

The manner in which the UE selects the PLMN of the satellite network corresponding to the current location is the same as that in the Embodiment 1, and details are not repeated here.

EMBODIMENT 3

Figure 6:
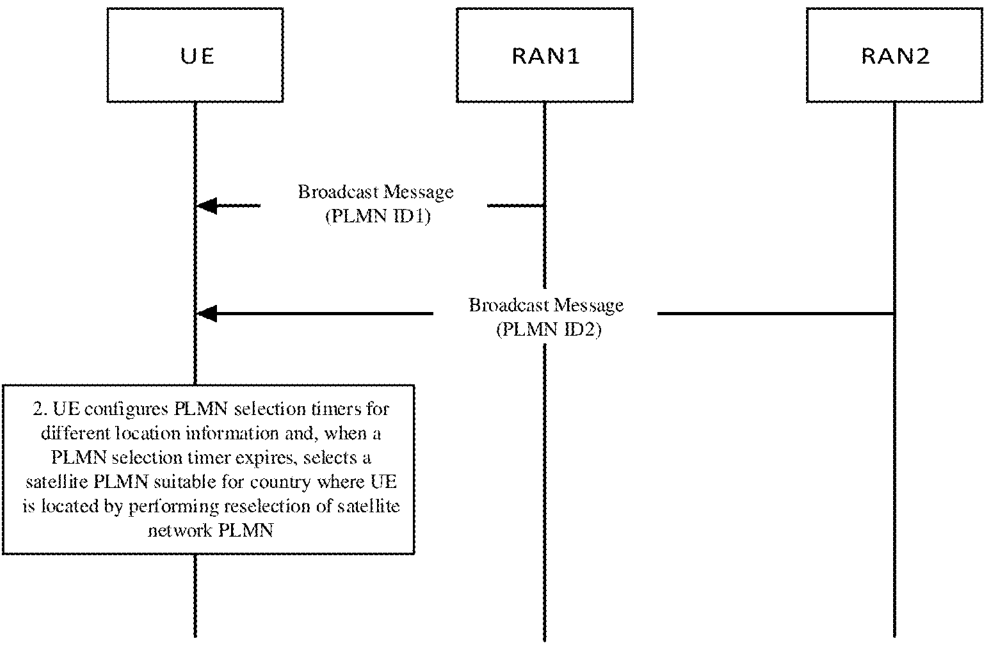
FIG. 6 is an implementation flowchart of Embodiment 3 of this application.

FIG. 6 is an implementation flowchart of Embodiment 3 of this application, including the following steps.

In step 1, the satellite RAN 1 covering country 1 and country 2 performs broadcasting, the broadcast message carries the corresponding PLMN identifier (e.g., PLMN ID 1), and the PLMN ID 1 includes (MCC 1+MNC 1). The satellite RAN 2 covering country 2 performs broadcasting, the broadcast message carries a PLMN identifier (e.g., PLMN ID 2), and the PLMN ID 2 includes (MCC 2+MNC 2).

In step 2, the UE performs PLMN selection according to the location information of the UE, and after the PLMN selection is completed, the UE starts a PLMN selection timer. In some embodiments, the PLMN timer is configured for different locations. For example, taking the selection priority list shown in FIG. 4A and FIG. 4B as an example, PLMN selection timers corresponding to respective countries may be added to the preconfigured selection priority list, for example, by adding PLMN selection timers corresponding to country X and country Y in FIG. 4A and FIG. 4B.

After the PLMN selection is completed, the UE starts the PLMN selection timer corresponding to the country where it is currently located. When the PLMN selection timer expires, the UE re-selects the PLMN of the satellite network according to its own location information and the selection priority list. The specific form of the selection priority list and the manner in which the UE selects the PLMN are the same as those in the Embodiment 1, and are not repeated here.

EMBODIMENT 4

Figure 7:
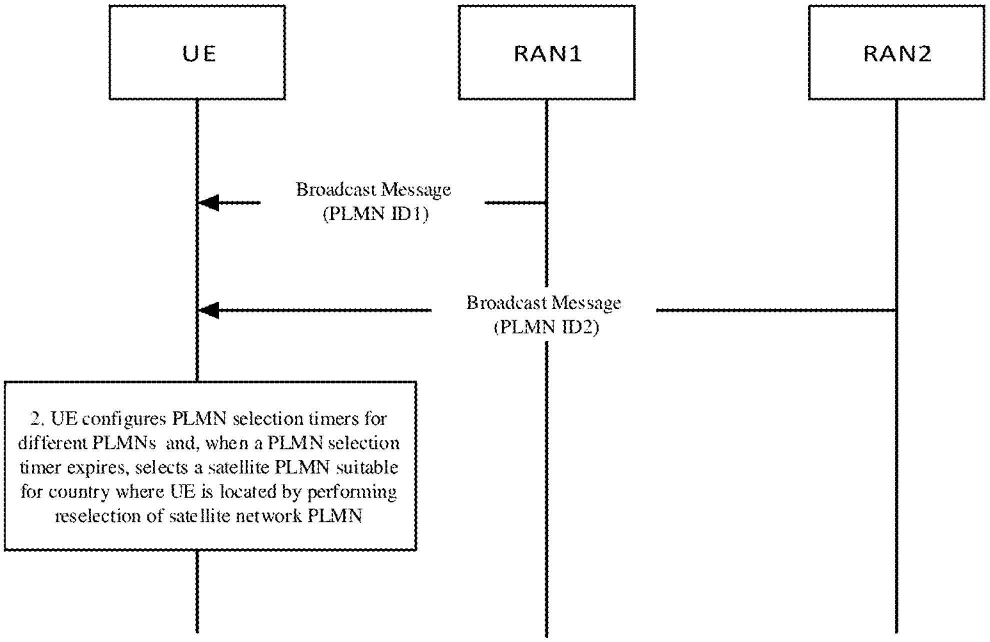
FIG. 7 is an implementation flowchart of Embodiment 4 of this application.

FIG. 7 is an implementation flowchart of Embodiment 4 of this application, including the following steps.

In step 1, the satellite RAN 1 covering country 1 and country 2 performs broadcasting, the broadcast message carries a corresponding PLMN identifier (e.g., PLMN ID 1), and the PLMN ID 1 includes (MCC 1+MNC 1). The satellite RAN 2 covering country 2 performs broadcasting, the broadcast message carries a PLMN identifier (e.g., PLMN ID 2), and the PLMN ID 2 includes (MCC 2+MNC 2).

In step 2, the UE performs PLMN selection according to the location information of the UE, and after the PLMN selection is completed, the UE starts a PLMN selection timer. In some embodiments, the PLMN timer is configured for different PLMNs. For example, taking the selection priority list shown in FIG. 4A and FIG. 4B as an example, the PLMN selection timers corresponding to respective PLMNs may be added to the preconfigured selection priority list, for example, by adding PLMN selection timers corresponding to PLMN identifiers including PLMN a, PLMN b, PLMN c, PLMN d and the like.

After the PLMN selection is completed, the UE starts the PLMN selection timer corresponding to the currently selected PLMN. When the PLMN selection timer expires, the UE re-selects the PLMN of the satellite network according to its own location information and the selection priority list. The specific form of the selection priority list and the manner in which the UE selects the PLMN are the same as those in the Embodiment 1, and are not repeated here.

EMBODIMENT 5

FIG. 8 is an implementation flowchart of Embodiment 5 of this application, including the following steps.

In step 1, the satellite RAN 1 covering country 1 and country 2 performs broadcasting, the broadcast message carries the corresponding PLMN identifier (e.g., PLMN ID 1), and the PLMN ID 1 includes (MCC 1+MNC 1). The satellite RAN 2 covering country 2 performs broadcasting, the broadcast message carries the PLMN identifier (e.g., PLMN ID 2), and the PLMN ID 2 includes (MCC 2+MNC 2).

In step 2, the UE performs PLMN selection and access according to the location information of the UE.

In step 3, the UE performs the registration procedure. During the registration procedure, the network device, for example, the AMF (Access and Mobility Management Function), allocates a new 5G-GUTI, 5G Globally Unique Temporary UE Identity) for the UE.

In step 4, the AMF triggers the location service procedure, which may be triggered periodically. In this way, the AMF can periodically obtain the location information of the UE.

In step 5, according to the location information of the UE obtained at different time points, the AMF can determine whether the location (e.g., country) of the UE has changed. When the AMF determines that the country where the UE is located has changed, step 6 is performed.

In step 6, the AMF sends a first indication message to the UE, where the first indication message indicates the UE to perform PLMN selection. Specifically, the first indication message may include a NAS (Non-Access Stratum) message.

In step 7, the UE receives the first indication message from the network device (e.g., AMF), and re-selects the PLMN of the satellite network according to its own location information and the selection priority list. Before performing PLMN selection, the UE first enters the idle state. The specific form of the selection priority list and the manner in which the UE selects the PLMN are the same as those in the Embodiment 1, and are not repeated here.

In the above embodiments, the location of the UE is specifically described as the country where the UE is located. In other embodiments of this application, the location of the UE may also be a region. This application does not limit the specific meaning of the location of the UE.

To sum up, it can be seen that the method for selecting PLMN based on location information in the NTN (non-terrestrial network) proposed in this application can enable the UE to select PLMN in time during its movement, thereby avoiding that the UE still uses the satellite network outside the country/region where it is located.

This application further proposes a method for indicating network selection. FIG. 9 is a schematic flowchart of a method 900 for indicating network selection according to some embodiments of this application. The method includes at least part of the following contents.

In S910, the network device determines whether the location of the terminal device changes; and if yes, it sends a first indication message to the terminal device, where the first indication message indicates the terminal device to perform PLMN selection.

Optionally, the first indication message includes a NAS message.

Optionally, determining, by the network device, whether the location of the terminal device has changed includes: periodically acquiring, by the network device, the location of the terminal device, and determining whether the location of the terminal device changes according to locations of the terminal device acquired at different time points.

Optionally, the location of the terminal device includes the country/region where the terminal device is located.

Optionally, the network device includes AMF.

Some embodiments of this application further proposes a terminal device. FIG. 10 is a block diagram of a terminal device 1000 according to some embodiments of this application, including a selection module.

The selection module 1010 is configured to determine, in response to a preset situation and according to a location of the terminal device and a selection priority list, a public land mobile network (PLMN) of satellite network corresponding to the location of the terminal device.

Optionally, the preset situation includes: the location of the terminal device changes.

Optionally, the selection module 110 determines whether the location of the terminal device changes according to a mobile country code (MCC) in a broadcast message of terrestrial cellular network radio access network (TN-RAN) received at different time points.

Optionally, the selection module 110 determines whether the location of the terminal device changes according to positioning information of an upper-layer application at different time points.

Optionally, the preset situation includes: a PLMN selection timer expires.

Optionally, the PLMN selection timer is configured for different locations.

Optionally, the PLMN selection timer is configured for different PLMNs.

Optionally, the preset situation includes: a first indication message is received from a network device, and the first indication message indicates the terminal device to perform PLMN selection.

Optionally, the first indication message includes a NAS message.

Optionally, the location of the terminal device is determined by the selection module 1010 according to an MCC in a broadcast message of TN-RAN.

Optionally, the location of the terminal device is determined by the selection module 1010 according to positioning information of an upper-layer application.

Optionally, the selection priority list is configured on the terminal device.

Optionally, the selection priority list includes information on PLMNs of satellite network corresponding to different locations.

Optionally, MCC information in the information on PLMNs corresponds to the locations.

Optionally, the location of the terminal device includes: a country/region where the terminal device is located.

It should be understood that the above and other operations and/or functions of the modules in the terminal device according to the embodiments of this application are respectively to implement the corresponding process of the terminal device in the method 200 of FIG. 2, and are not repeated here for brevity.

Figure 11:
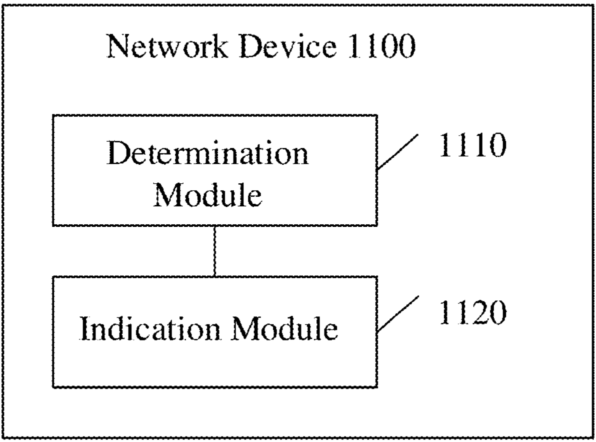
FIG. 11 is a block diagram of a network device 1100 according to some embodiments of this application.

Some embodiments of this application further proposes a network device. FIG. 11 is a block diagram of a network device 1100 according to some embodiments of this application, including following modules.

The determination module 1110 is configured to determine whether a location of a terminal device changes; and The indication module 1120 is configured to send, in response to that the location of the terminal device changes, a first indication message to the terminal device, where the first indication message indicates the terminal device to perform PLMN selection.

Optionally, the first indication message includes an NAS message.

Optionally, the determination module 1110 is configured to periodically acquire the location of the terminal device, and determine whether the location of the terminal device changes according to locations of the terminal device acquired at different time points.

Optionally, the location of the terminal device includes a country/region where the terminal device is located.

Optionally, the network device includes an AMF.

It should be understood that the above and other operations and/or functions of the modules in the network device according to the embodiments of this application are respectively to implement the corresponding flow of the network device in the method 900 of FIG. 9, and are not repeated here for brevity.

It should be noted that the functions described by the respective modules (submodules, units, or components, etc.) in the terminal device 1000 and the network device 1100 in the embodiments of this application may be implemented by different modules (submodules, units, or components, etc.), and may also be implemented by the same module (submodule, unit or component, etc.). In addition, the indication module in some embodiments of this application may be implemented by a transceiver of the device, and some or all of the other modules may be implemented by a processor of the device.

Figure 12:
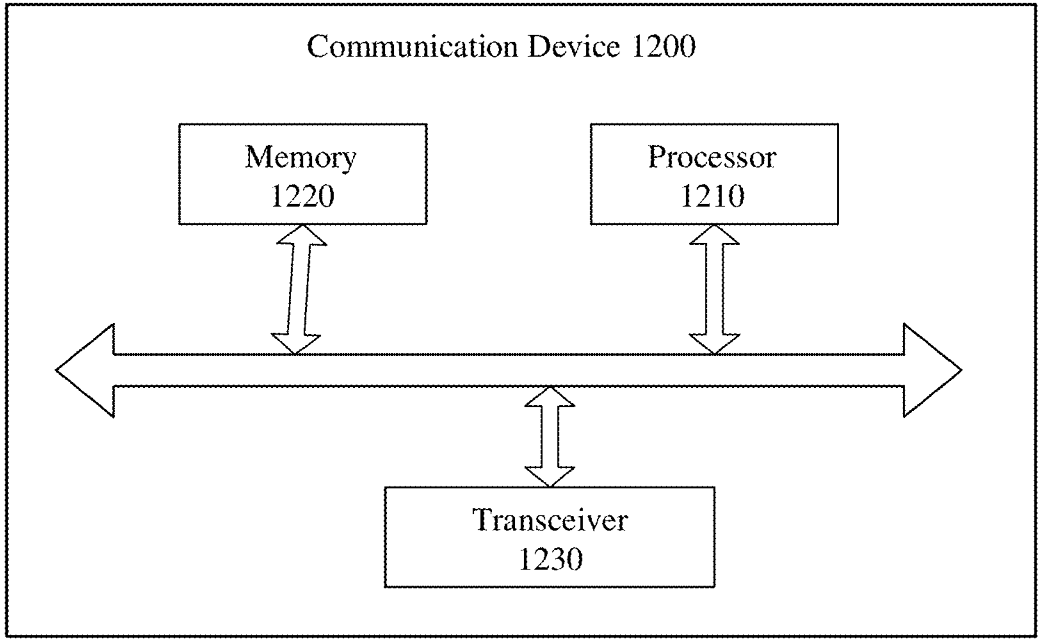
FIG. 12 is a block diagram of a communication device 1200 according to some embodiments of this application.

FIG. 12 is a block diagram of a communication device 1200 according to some embodiments of this application. The communication device 1200 shown in FIG. 12 includes a processor 1210, and the processor 1210 may call and run a computer program from a memory to implement the method according to some embodiments of this application.

Optionally, as shown in FIG. 12, the communication device 1200 may further include a memory 1220. The processor 1210 may call and run the computer program from the memory 1220 to implement the methods according to some embodiments of this application.

The memory 1220 may be a separate device independent of the processor 1210, or may be integrated in the processor 1210.

Optionally, as shown in FIG. 12, the communication device 1200 may further include a transceiver 1230, and the processor 1210 may control the transceiver 1230 to communicate with other devices, specifically, may send information or data to other devices, or receive information or data sent by other devices.

In some embodiments, the transceiver 1230 may include a transmitter and a receiver. The transceiver 1230 may further include antennas, and the number of the antennas may be one or more.

Optionally, the communication device 1200 may be a terminal device according to some embodiments of this application, and the communication device 1200 may implement the corresponding processes implemented by the terminal device in each method according to some embodiments of this application, which is not repeated here for brevity.

Optionally, the communication device 1200 may be a network device according to some embodiments of this application, and the communication device 1200 may implement the corresponding processes implemented by the network device in each method according to some embodiments of this application, which is not repeated here for brevity.

Figure 13:
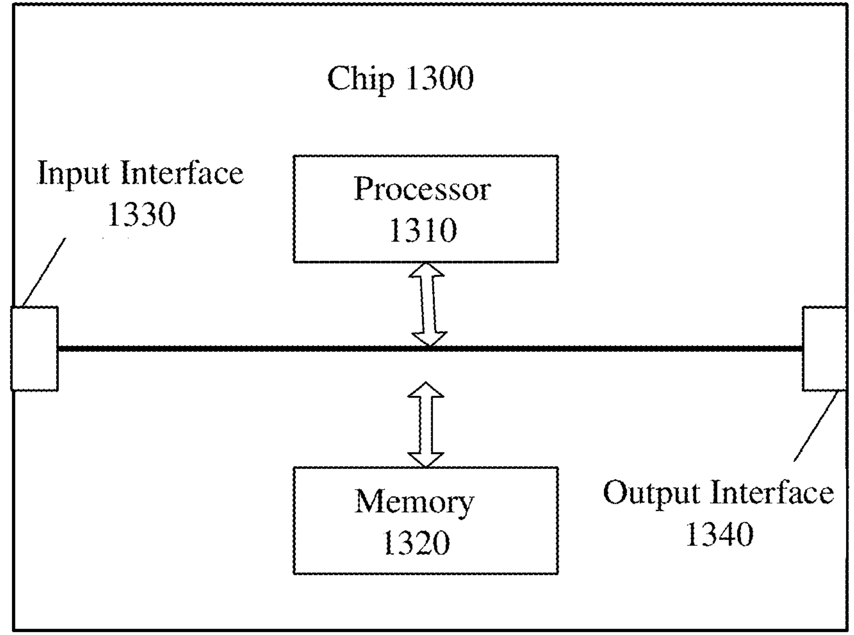
FIG. 13 is a block diagram of a chip 1300 according to some embodiments of this application.

FIG. 13 is a block diagram of a chip 1300 according to some embodiments of this application. The chip 1300 shown in FIG. 13 includes a processor 1310, and the processor 1310 may call and run a computer program from a memory to implement the method according to some embodiments of this application.

Optionally, as shown in FIG. 13, the chip 1300 may further include a memory 1320. The processor 1310 may call and run the computer program from the memory 1320 to implement the methods according to some embodiments of this application.

The memory 1320 may be a separate device independent of the processor 1310, or may be integrated in the processor 1310.

Optionally, the chip 1300 may further include an input interface 1330. The processor 1310 may control the input interface 1330 to communicate with other devices or chips, and specifically, may obtain information or data sent by other devices or chips.

Optionally, the chip 1300 may further include an output interface 1340. The processor 1310 may control the output interface 1340 to communicate with other devices or chips, and specifically, may output information or data to other devices or chips.

Optionally, the chip may be applied to the terminal device according to some embodiments of this application, and the chip may implement the corresponding processes implemented by the terminal device in each method according to some embodiments of this application, which is not repeated here for brevity.

Optionally, the chip may be applied to the network device according to some embodiments of this application, and the chip may implement the corresponding processes implemented by the network device in each method according to some embodiments of this application, which is not repeated here for brevity.

It should be understood that the chip mentioned in some embodiments of this application may also be referred to as a system-level chip, a system chip, a chip system, or a system-on-a-chip, or the like.

The above-mentioned processor may be a general-purpose processor, a digital signal processor (DSP), an field programmable gate array (FPGA), an application specific integrated circuit (ASIC) or other programmable logic devices, transistor logic devices, discrete hardware components, or the like. The general-purpose processor mentioned above may be a microprocessor or any conventional processor or the like.

The memory mentioned above may be either volatile memory or non-volatile memory, or may include both volatile and non-volatile memory. The non-volatile memory may be read-only memory (ROM), programmable ROM (PROM), erasable PROM (EPROM), electrically EPROM (EEPROM) or flash memory. The volatile memory may be random access memory (RAM).

It should be understood that the above memory is an example but not a limitative description, for example, the memory according to some embodiments of this application may also be static RAM (SRAM), dynamic RAM (DRAM), synchronous DRAM (SDRAM), double data rate SDRAM (DDR SDRAM), enhanced SDRAM (ESDRAM), synch link DRAM (SLDRAM), direct Rambus RAM (DR RAM), and the like. In other words, the memory according to some embodiments of this application is intended to include but not limited to these and any other suitable types of memory.

In the above-mentioned embodiments, it may be implemented in whole or in part by software, hardware, firmware or any combination thereof. When implemented in software, it may be implemented in whole or in part in the form of a computer program product. The computer program product includes one or more computer instructions. When the computer program instructions are loaded and executed on a computer, all or part of the processes or functions described in the embodiments of this application are generated. The computer may be a general purpose computer, special purpose computer, computer network, or other programmable device. The computer instructions may be stored on or transmitted from one computer readable storage medium to another. For example, the computer instructions may be transmitted from a website site, computer, server or data center to another website site, computer, server or data center in a wired manner (e.g., coaxial cable, optical fiber, digital subscriber line (DSL)) or a wireless manner (e.g., infrared, radio, microwave, and the like). The computer-readable storage medium may be any available medium that can be accessed by a computer or a data storage device such as a server, data center, etc., that is integrated with one or more available medium. The available medium may be a magnetic medium (e.g., a floppy disk, a hard disk, a magnetic tape), an optical medium (e.g., a DVD), a semiconductor medium (e.g., a solid state disk (SSD)), or the like.

It should be understood that, in various embodiments of this application, the size of the sequence numbers of the above-mentioned processes does not mean the sequence of execution, and the execution sequence of each process should be determined by its functions and internal logic, and should not constitute any limitation on the embodiments of this application.

Those skilled in the art can clearly understand that, for the convenience and brevity of description, the specific working process of the above-described systems, devices and units may refer to the corresponding processes in the foregoing method embodiments, which will not be repeated here.

The above are only specific embodiments of this application, but the protection scope of this application is not limited thereto. Any person skilled in the art who is familiar with the technical scope disclosed in this application can easily think of changes or substitutions, which should be covered within the protection scope of this application. Therefore, the protection scope of this application shall be subject to the protection scope of the claims.

What is claimed is:

1. A network selection method, comprising:

selecting, by a terminal device according to a location of the terminal device, a public land mobile network (PLMN) of satellite network;

performing, by the terminal device, a registration procedure with a network device, wherein the network device is configured to obtain location information of the terminal device and determine, according to the location information obtained at different time points, whether a country where the terminal device is located changes;

receiving, by the terminal device, a first indication message from the network device, wherein the first indication message is sent by the network device upon determining that the country where the terminal device is located changes, and the first indication message indicates the terminal device to perform PLMN re-selection; and re-selecting, by the terminal device in response to receiving the first indication message and according to the location of the terminal device and a selection priority list, a PLMN of satellite network corresponding to the location of the terminal device.

2. The method as claimed in claim 1, wherein the terminal device further determines whether the location of the terminal device changes according to a mobile country code (MCC) in a broadcast message of terrestrial cellular network radio access network (TN-RAN) received at different time points.

3. The method as claimed in claim 1, wherein the first indication message comprises a non-access stratum (NAS) message.

4. The method as claimed in claim 1, wherein the location of the terminal device is determined by the terminal device according to an MCC in a broadcast message of TN-RAN.

5. The method as claimed in claim 1, wherein the location of the terminal device is determined by the terminal device according to positioning information of an upper-layer application.

6. The method as claimed in claim 1, wherein the selection priority list is configured on the terminal device.

7. The method as claimed in claim 6, wherein the selection priority list comprises information on PLMNs of satellite network corresponding to different locations.

8. The method as claimed in claim 7, wherein MCC information in the information on PLMNs corresponds to the different locations.

9. A terminal device, comprising: a processor and a memory, wherein the memory is configured to store a computer program, and the processor, through invoking and running the computer program stored in the memory, is configured to:

select, according to a location of the terminal device, a public land mobile network (PLMN) of satellite network;

perform a registration procedure with a network device, wherein the network device is configured to obtain location information of the terminal device and determine, according to the location information obtained at different time points, whether a country where the terminal device is located changes;

receive a first indication message from the network device, wherein the first indication message is sent by the network device upon determining that the country where the terminal device is located changes, and the first indication message indicates the terminal device to perform PLMN re-selection; and re-select, in response to receiving the first indication message and according to the location of the terminal device and a selection priority list, a PLMN of satellite network corresponding to the location of the terminal device.

10. The terminal device as claimed in claim 9, wherein the processor is further configured to determine whether the location of the terminal device changes according to a mobile country code (MCC) in a broadcast message of terrestrial cellular network radio access network (TN-RAN) received at different time points.

11. The terminal device as claimed in claim 9, wherein the first indication message comprises a non-access stratum (NAS) message.

12. The terminal device as claimed in claim 9, wherein the location of the terminal device is determined by the terminal device according to an MCC in a broadcast message of TN-RAN.

13. The terminal device as claimed in claim 9, wherein the location of the terminal device is determined by the terminal device according to positioning information of an upper-layer application.

14. The terminal device as claimed in claim 9, wherein the selection priority list is configured on the terminal device.

15. The terminal device as claimed in claim 14, wherein the selection priority list comprises information on PLMNs of satellite network corresponding to different locations.

16. The terminal device as claimed in claim 15, wherein MCC information in the information on PLMNs corresponds to the different locations.

17. A network device, comprising: a processor and a memory, wherein the memory is configured to store a computer program, and the processor, through invoking and running the computer program stored in the memory, is configured to:

perform a registration procedure with a terminal device;

obtain a location of a terminal device and determine, according to the location obtained at different time points, whether a country where the terminal device is located changes; and send, via a transceiver and in response to that the country where the terminal device is located changes, a first indication message to the terminal device, wherein the first indication message indicates the terminal device to perform PLMN re-selection in response to receiving the first indication message and according to the location of the terminal device and a selection priority list.

18. The network device as claimed in claim 17, wherein the first indication message comprises an NAS message.

19. The network device as claimed in claim 17, wherein the network device comprises an AMF.

20. The network device as claimed in claim 17, wherein the processor is configured to:

periodically acquire the location of the terminal device.

* * * * *